US012742504B2

(12) United States Patent
Kumar et al.

(10) Patent No.: US 12,742,504 B2
(45) Date of Patent: Sep. 22, 2026

(54) BALL VALVE WITH ENDURANCE ENHANCING FEATURES

(71) Applicant: Precision Engine Controls Corporation, San Diego, CA (US)

(72) Inventors: Benoy Kumar, San Diego, CA (US); Kyle J. Smith, San Diego, CA (US); Kim Cockbill, Frazier Park, CA (US)

(73) Assignee: Precision Engine Controls Corporation, San Diego, CA (US)

( * ) Notice: Subject to any disclaimer, the term of this patent is extended or adjusted under 35 U.S.C. 154(b) by 184 days.

(21) Appl. No.: 18/892,697

(22) Filed: Sep. 23, 2024

(65) Prior Publication Data

US 2025/0224038 A1 Jul. 10, 2025

Related U.S. Application Data

(60) Provisional application No. 63/617,527, filed on Jan. 4, 2024.

(51) Int. Cl.
*F16K 5/06* (2006.01)
*F16K 5/20* (2006.01)
*F16K 31/524* (2006.01)

(52) U.S. Cl.
CPC .............. *F16K 5/0605* (2013.01); *F16K 5/20* (2013.01); *F16K 31/52425* (2013.01)

(58) Field of Classification Search
CPC .... F16K 5/0605; F16K 5/0647; F16K 5/0689; F16K 5/14; F16K 5/20; F16K 5/204; F16K 27/067; F16K 5/201; F16K 31/52425; F16K 31/528; F16K 5/08
USPC .................................. 251/192, 88, 160, 162
See application file for complete search history.

(56) References Cited

U.S. PATENT DOCUMENTS 3,245,653 A * 4/1966 Lavigueur ............... F16K 5/201 251/315.08
3,901,474 A * 8/1975 Kubota ................... F16K 5/205 251/188
4,262,691 A 4/1981 Kacal
4,366,946 A * 1/1983 Roark ..................... F16K 5/201 251/188

(Continued)

FOREIGN PATENT DOCUMENTS

CN 118066322 A * 5/2024 ............... F16K 5/20
CN 118066323 A * 5/2024 ............... F16K 5/20

(Continued)

OTHER PUBLICATIONS

Machine Translation of CN 118066322 A (Year: 2024).*
Machine Translation of CN 118066323 A (Year: 2024).*
Machine Translation of CN 118856071 A (Year: 2024).*

*Primary Examiner* — Craig M Schneider
*Assistant Examiner* — Andrew J Rost
(74) *Attorney, Agent, or Firm* — McDonnell Boehnen Hulbert & Berghoff LLP

(57) ABSTRACT

An example valve includes: a ball rotatable by a shaft, wherein the ball has a cam surface; a metering seat that contacts the ball; a sealing seat that contacts the ball when the ball is in a closed position; and a follower coupled to the sealing seat, wherein when the ball is in an open rotational range that allows fluid flow from a first port to a second port, the follower is engaged with the cam surface, thereby lifting the sealing seat off the ball, while the metering seat remains in contact with the ball.

20 Claims, 9 Drawing Sheets

(56) References Cited

U.S. PATENT DOCUMENTS

| | | | | |
|---|---|---|---|---|
| 4,476,933 | A | 10/1984 | Brooks | |
| 5,611,516 | A | 3/1997 | Reinickie et al. | |
| 5,676,347 | A * | 10/1997 | Knox | F16K 5/201 251/170 |
| 6,378,841 | B1 | 4/2002 | Russell | |
| 9,328,827 | B2 | 5/2016 | Rusell | |
| 12,031,643 | B2 * | 7/2024 | Agosti | F16K 5/20 |
| 2021/0095770 | A1 * | 4/2021 | Liu | F16K 35/10 |
| 2025/0215982 | A1 * | 7/2025 | Trewhella | F16K 27/067 |

FOREIGN PATENT DOCUMENTS

| | | | |
|---|---|---|---|
| CN | 118856071 A * | 10/2024 | F16K 35/025 |
| GB | 1 377 446 | 12/1974 | |

* cited by examiner

500

ROTATING A BALL OF A VALVE FROM A CLOSED POSITION, WHEREIN THE BALL HAS AN OPENING THERETHROUGH TO CONTROL FLUID FLOW FROM AN INLET PORT TO AN OUTLET PORT, WHEREIN THE BALL HAS A CAM SURFACE, WHEREIN THE VALVE COMPRISES (I) A METERING SEAT THAT CONTACTS THE BALL, WHEREIN WHEN THE BALL IS ROTATED TO AN OPEN POSITION WITHIN AN OPEN ROTATIONAL RANGE, THE METERING SEAT PREVENTS LEAKAGE AROUND THE BALL AND MAINTAINS FLUID FLOW FROM THE INLET PORT THROUGH THE METERING SEAT AND THE OPENING TO THE OUTLET PORT, (II) A SEALING SEAT THAT CONTACTS THE BALL WHEN THE BALL IS IN A CLOSED POSITION AND PREVENTS LEAKAGE IN EITHER DIRECTION THROUGH THE VALVE, AND (III) A FOLLOWER COUPLED TO THE SEALING SEAT

502

UPON THE BALL REACHING A PARTICULAR ROTATIONAL POSITION, CAUSING THE FOLLOWER TO ENGAGE THE CAM SURFACE, THEREBY LIFTING THE SEALING SEAT OFF THE BALL, WHILE THE METERING SEAT REMAINS IN CONTACT WITH THE BALL

504

FURTHER ROTATING THE BALL TO A THRESHOLD ROTATIONAL POSITION, THEREBY EXPOSING AT LEAST A PORTION OF THE OPENING TO ALLOW FLUID FLOW FROM THE INLET PORT THROUGH THE METERING SEAT AND THE OPENING TO THE OUTLET PORT

BALL VALVE WITH ENDURANCE ENHANCING FEATURES

CROSS REFERENCE TO RELATED APPLICATION

The present application claims priority to U.S. Provisional Application No. 63/617,527, filed on Jan. 4, 2024, the entire contents of which are herein incorporated by reference as if fully set forth in this description.

BACKGROUND

A ball valve is a type of valve that uses a hollow, perforated ball to control the flow of fluid through it. Typically, in a two seat arrangement, one seat on each side contacts the ball to seal the valve and prevent flow when the valve is in a closed position and ensure that when the valve is open, flow goes through the controlled opening in the ball rather than around the ball. These seats remain in contact with the ball when the ball rotates to an open position.

Ball valves have evolved over time. Some conventional ball valves have full bores and were used primarily as on/off valves. In such valves, the ball has a full circular cutout that forms a large flow area when the valve is fully open. These valves are characterized by poor flow control accuracy.

To improve the low flow accuracy, some ball valves have a ball cutout that enables proportional control. Particularly, a magnitude of a command signal to the actuator of the valve determines how much the valve opens. In some cases a command signal may be dithering, either intentionally for fine process control or unintentionally due to signal noise in the system.

However, one drawback for dither is that it causes the seats to continually rub against the ball of a conventional valve where the seats remain in contact with the ball all the time. Such continual rubbing may cause the seats and/or the ball to wear over time, which could degrade the internal leakage rating of the valve and cause deterioration in performance of the valve.

To increase endurance and life of the valve, a typical approach has been to use various materials and coatings to reduce wear. While these materials and coatings may improve endurance of the valve slightly, all materials and coatings wear over time under constant rubbing conditions. As such, improvement from material choice or coatings does not provide enough valve endurance enhancement to justify the use of conventional ball valves in applications that have strict leakage standards or ratings, such as fuel metering in industrial gas turbine applications. Particularly, using such materials does not address undesirable excessive wear resulting from continual rubbing between the ball and the seats.

It may thus be desirable to have a ball valve with an alternative configuration that enhances endurance of the valve. It is with respect to these and other considerations that the disclosure made herein is presented.

SUMMARY

The present disclosure describes implementations that relate to a ball valve with endurance enhancing features.

In a first example implementation, the present disclosure describes a valve. The valve includes: a housing having an inlet port and an outlet port; a shaft disposed within the housing; a ball disposed within the housing and rotatable by the shaft, wherein the ball has an opening therethrough to control fluid flow from the inlet port to the outlet port, and wherein the ball has a cam surface; a metering seat that contacts the ball, wherein when the ball is rotated to an open position within an open rotational range, the metering seat prevents leakage around the ball and maintains fluid flow from the inlet port through the metering seat and the opening to the outlet port; a sealing seat that contacts the ball when the ball is in a closed position and prevents leakage in either direction through the valve; and a follower coupled to the sealing seat, wherein when the ball is in the open rotational range, the follower is engaged with the cam surface, thereby lifting the sealing seat off the ball, while the metering seat remains in contact with the ball.

In a second example implementation, the present disclosure describes an assembly. The assembly includes: an electronics module; an electric motor, wherein the electronics module is mounted to and controls the electric motor; and the valve of the first example implementation, wherein the shaft of the valve is rotatable via the electric motor.

In a third example implementation, the present disclosure describes a method of operating the valve of the first example implementation.

The foregoing summary is illustrative only and is not intended to be in any way limiting. In addition to the illustrative aspects, implementations, and features described above, further aspects, implementations, and features will become apparent by reference to the figures and the following detailed description.

BRIEF DESCRIPTION OF THE FIGURES

FIG. 9 is a flowchart of a method for operating a valve, according to an example implementation.

DETAILED DESCRIPTION

Disclosed herein are systems, assemblies, and methods associated with a ball valve having features that enhance endurance of the valve by preventing continual rubbing between a ball of the valve and a sealing seat of the valve.

Within examples, a disclosed ball valve includes a metering seat and a sealing seat to separate the metering function from the sealing function. The valve typically operates in an open mode and allows fluid flow through the ball when the ball is rotated to a rotational position in an open rotational range. The "open rotational range" is the rotational range or span of the ball in which the valve is open to allow flow therethrough. The open rotational range is defined between a threshold rotational position where the valve starts to allow flow and the full opening or 100% of the full rotational range. Below the threshold rotational position, the valve may be closed, blocking fluid flow through the ball.

The disclosed valve includes a cam follower mechanism that interacts with a cam surface formed in the ball, thereby pushing or lifting the sealing seat away from the ball before reaching the threshold rotational position. This way, the sealing seat does not contact or rub against the ball when the valve is in the open or operable range where the valve operates most of the time. As a result, the sealing surfaces of the ball and the sealing seat do not wear and are preserved, thereby enhancing life and endurance of the valve. On the other hand, the metering seat maintains contact with the ball. However, a biasing force applied to the metering seat toward the ball is light, since a lower contact force is required for metering compared to sealing, thus preventing deterioration of the surface of the metering seat or the ball.

Within the examples, two cam follower mechanisms are used, one on each side of the ball. This way, lifting force pushing the sealing seat away from the ball is evenly or uniformly applied to the sealing seat.

In examples, the cam follower mechanism has a roller that interacts with and contacts the cam surface of the ball. Such roller may reduce friction and may accommodate any dithering in the command signal provided to the ball.

Figure 1:
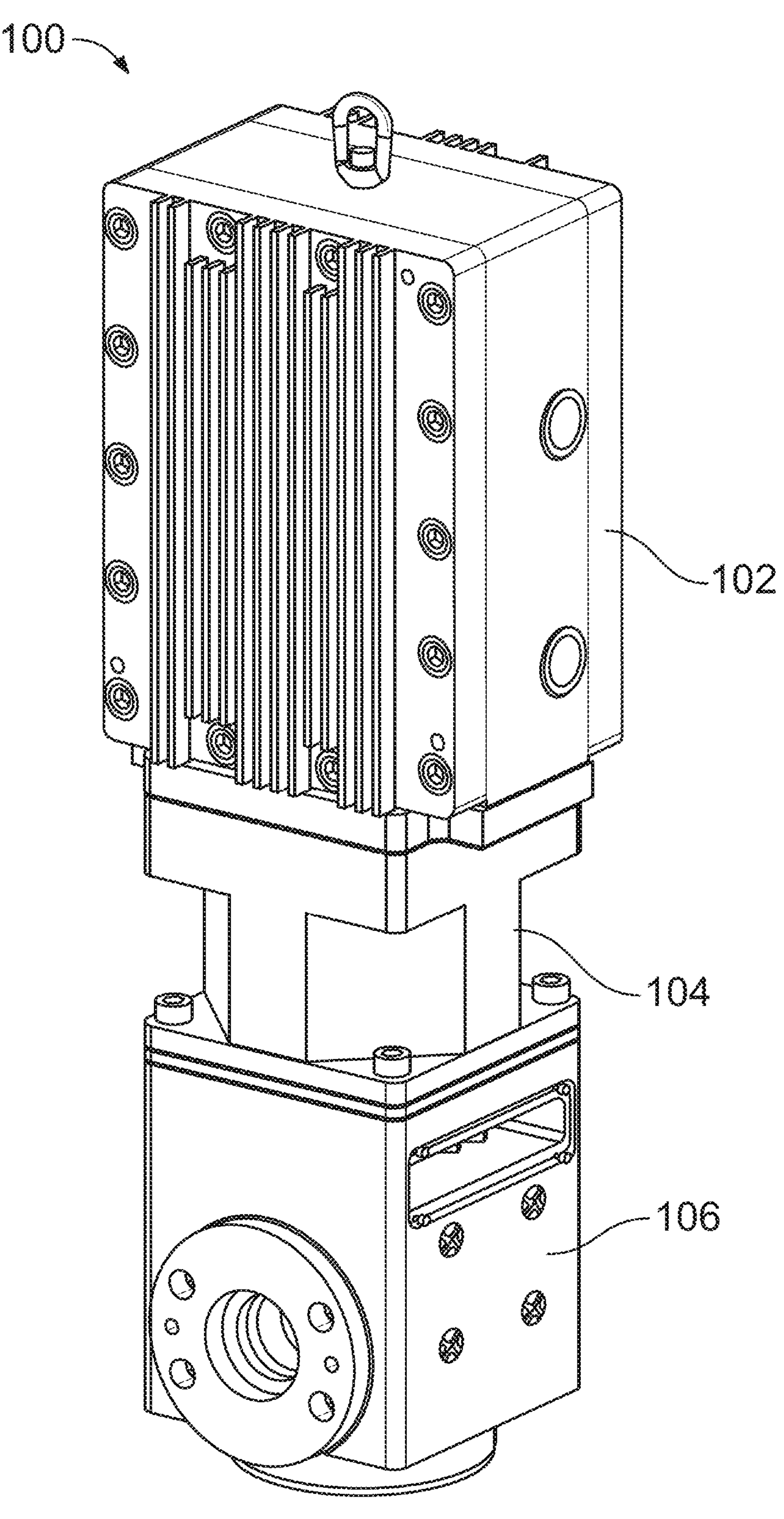
FIG. 1 illustrates a perspective view of an assembly, according to an example implementation.

FIG. 1 illustrates a perspective view of an assembly 100, according to an example implementation. The assembly includes an electronics module 102, an electric motor 104, and a valve 106. As depicted, the electronics module 102 is mounted to the electric motor 104, which is coupled to the valve 106 to drive a movable element of the valve 106.

In the example implementation described herein, the valve 106 is a ball valve that is electrically actuated via the electric motor 104. However, it should be understood that other actuation mechanisms could be used. For instance, a handle or lever can be used to manually actuate the ball valve. In another example, the ball valve can be actuated via a fluid actuation mechanism (pneumatic or hydraulic).

The electric motor 104 can be any type of electric motors (e.g., permanent magnet motor, a switch reluctance motor, a flux switching motor, an induction motor, etc.). For example, the electric motor 104 can include a stator fixedly disposed within a housing of the electric motor 104.

The electronics module 102 is configured to control the electric motor 104. For instance, the electronics module 102 can include a controller and an inverter that are configured to drive the electric motor 104.

Figure 2:
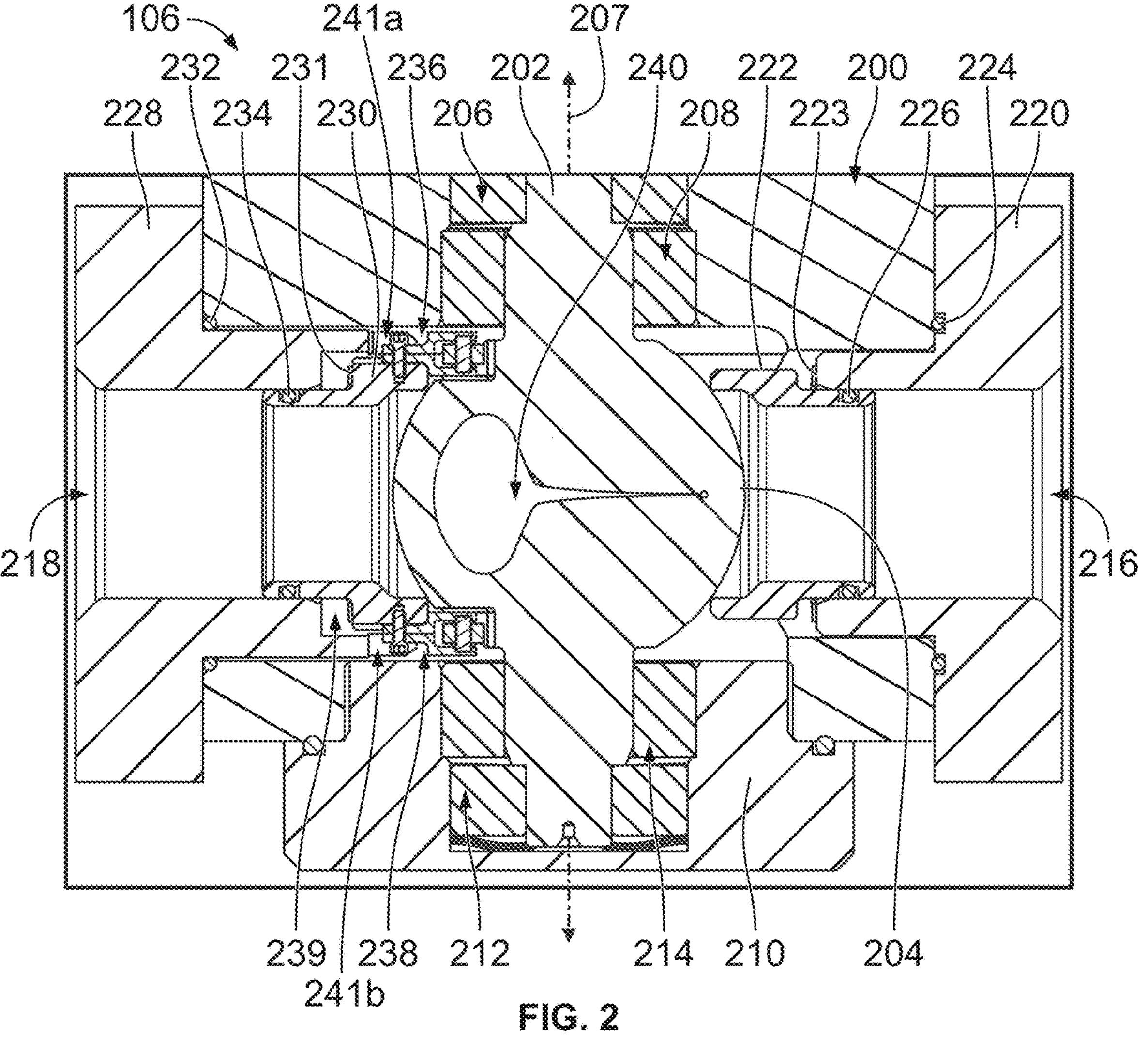
FIG. 2 illustrates a partial cross-sectional view of a valve of the assembly of FIG. 1, according to an example implementation.

FIG. 2 illustrates a partial cross-sectional view of the valve 106, according to an example implementation. The valve 106 includes a housing 200 in which a stem or shaft 202 is disposed. The shaft 202 can be coupled to or integrated with an output shaft (not shown) of the electric motor 104, and thus the rotary motion of the rotor of the electric motor 104 is transmitted to the shaft 202. Various mechanisms could be used to couple the shaft 202 to the output shaft of the electric motor 104 such as a spline arrangement, as key-keyway arrangements, self-holding taper arrangement, press fitting, a clamp arrangement, etc. or a combination thereof. Further, in other examples, as mentioned above, a lever or other actuation device could be coupled to the shaft 202, rather than an output shaft of an electric motor.

The valve 106 includes a ball 204 coupled to the shaft 202 and configured to control fluid flow through the valve 106 as described in more detail below. In an example, the ball 204 is integrated with the shaft 202 to form a component having a unitary construction. Notably, by having the shaft 202 integrated with the ball 204, there is no mechanical hysteresis (e.g., slop or play) between the rotary motion of the shaft 202 and the rotary motion of the ball 204. This configuration may enhance accuracy in controlling the rotational position of the ball 204, and thus the fluid flow through the valve 106. However, in other examples, the shaft 202 and the ball 204 can be separate components coupled together via any coupling mechanism (e.g., press fit, splines, key arrangement, etc.).

The housing 200 accommodates a first bearing subassembly 206 (e.g., one or more ball bearings) disposed about an upper portion of the shaft 202 in FIG. 2 to facilitate rotation of the shaft 202 inside the housing 200 about a longitudinal axis 207 of the shaft 202. The valve 106 further includes a seal carrier 208 disposed around the shaft 202, longitudinally interposed between the first bearing subassembly 206 and the ball 204. The seal carrier 208 can include and support one or more seals (e.g., radial seals) to prevent fluid leakage around the shaft 202 or between the shaft 202 and the housing 200.

The valve 106 can include a cap 210, which is a hollow cylindrical component that in turn accommodates a second bearing subassembly 212 disposed about a bottom portion of the shaft 202 (the other side of the shaft 202 relative to the ball 204) to further support and facilitate rotation of the shaft 202 inside the housing 200. The valve 106 further includes a seal carrier 214 disposed around the shaft 202, longitudinally interposed between the second bearing subassembly 212 and the ball 204. Similar to the seal carrier 208, the seal carrier 214 can include and support one or more seals (e.g., radial seals) to prevent fluid leakage around the shaft 202 or between the shaft 202 and the cap 210.

The housing 200 includes a through-hole that operates as a fluid flow path formed therein, and the flow path is perpendicular to the axis of rotation of the shaft 202. Particularly, the housing 200 can have an inlet port 216 and an outlet port 218, and the ball 204 controls fluid flow from the inlet port 216 to the outlet port 218.

The valve 106 includes a first flange 220 mounted at the inlet port 216 and attached to the housing 200 (e.g., via fasteners). The first flange 220 supports and retains a metering seat 222 that contacts the ball 204. As shown, the metering seat 222 is proximate the inlet port 216 and is disposed on a side of the ball 204 that faces the inlet port 216. A spring 223 (e.g., a wave spring) biases the metering seat 222 toward the ball 204 to form a metal-to metal contact seal between the metering seat 222 and the ball 204 to prevent excess fluid flow around the ball 204 when the valve 106 is actuated to operate in an open state.

The valve 106 can further include a plurality of face and radial seals to ensure that no leakage occurs from the valve 106. For example, as depicted in FIG. 2, a face seal 224 can be used to seal between the first flange 220 and the housing 200, and a radial seal 226 can be used to seal between the metering seat 222 and the first flange 220.

The valve 106 similarly includes a second flange 228 mounted at the outlet port 218 and attached to the housing 200 (e.g., via fasteners). The second flange 228 supports and retains a sealing seat 230. As shown, the sealing seat 230 is proximate the outlet port 218 and is disposed on a respective side of the ball 204 that faces the outlet port 218.

A spring 231 (e.g., a wave spring) biases the sealing seat 230 toward the ball 204 to form a metal-to metal contact seal with the sealing seat 230 to prevent fluid leakage when the valve 106 is in a closed state shown in FIG. 2. The sealing seat 230 prevents leakage in either direction (from the inlet port 216 to the outlet port 218 and vice versa). As described below, the sealing seat 230 is configured to be lifted off the ball 204 when the valve 106 is actuated to operate in an open state.

The valve 106 can further include a seal 232 used to seal between the second flange 228 and the housing 200. The valve 106 can also include a radial seal 234 can be used to seal between the sealing seat 230 and the second flange 228.

Both the metering seat 222 and the sealing seat 230 are generally cylindrical and hollow members. The metering seat 222 has an internal channel or cavity that is aligned with and fluidly coupled to the inlet port 216, while the sealing seat 230 has a respective internal channel or cavity that is aligned with and fluidly coupled to the outlet port 218.

The valve 106 further includes a first follower 236 coupled to a first side (e.g., top side) of the sealing seat 230. The valve 106 also includes a second follower 238 coupled to a second side (e.g., bottom side), opposite the first side, of the sealing seat 230. The followers 236, 238 are configured as cam followers.

When the valve 106 is in the closed state shown in FIG. 2, the followers 236, 238 are disengaged from the ball 204 and allow the sealing seat 230 to contact the ball 204 to prevent leakage while the valve 106 is in the closed state. In this state, a gap 239 separates the sealing seat 230 from an internal shoulder of the second flange 228 as depicted in FIG. 2. On the other hand, as described in more detail below, the followers 236, 238 interact with the ball 204 to cause the sealing seat 230 to be lifted off, or pushed away from, the ball 204 when the valve 106 operates in the open state, e.g., in an open range of rotational movement of the ball 204. This way, no contact or continual rubbing occurs between the sealing seat 230 and the ball 204 when the valve 106 is open, enhancing the life and endurance of the ball 204 and/or the sealing seat 230.

The ball 204 is configured as a spherical shell that has an opening 240 formed therethrough (e.g., through a center of the ball 204). The opening 240 can also be referred to as a hole, bore, port, perforation, channel, or passage. When the ball 204 is in the position depicted in FIG. 2 (e.g., 0 degree rotational position), the ball 204 blocks the inlet port 216 and the outlet port 218 to prevent fluid flow through the valve 106. Particularly, in this position, the opening 240 is not aligned or overlapped with the either of the inlet port 216 or the outlet port 218, and fluid cannot flow through the valve 106.

To open the valve 106 and allow fluid flow therethrough, the electric motor 104 or other actuator can rotate the shaft 202 in a clockwise direction from a top view perspective relative to FIG. 2 (e.g., looking from the side of the first bearing subassembly 206 downward on the shaft 202 in FIG. 2). When the ball 204 reaches a threshold rotational position (e.g., 2.5 degrees), the opening 240 starts to clear the metering seat 222 and becomes partially exposed to fluid from the inlet port 216. In other words, a portion of the opening 240 moves past an edge of the metering seat 222 and is exposed to fluid from the inlet port 216. Fluid thus begins to flow through the exposed portion of the opening 240 (i.e., through the ball 204) and is then discharged through the sealing seat 230 and the outlet port 218.

If a higher flow rate is desired, the electric motor 104 can rotate the ball 204 further, progressively exposing more of the opening 240 to increase flow. In an example, the ball 204 can be rotated 90 degrees or more (e.g., up to 100% of the full rotational range) to reach a fully-open state (see FIG. 7 described below). To return the valve 106 to the closed state, a signal provided to the electric motor 104 can be removed, and a return spring (not shown) coupled to the shaft 202 returns the shaft 202 and the ball 204 to the closed state depicted in FIG. 2, for example.

In an example, the valve 106 is configured such that it is open when the command signal is in a particular range of command signals or the ball 204 is in a particular rotational range. For example, from the closed state shown in FIG. 2, the ball 204 can rotate from a zero degrees position to a threshold rotational position (e.g., 2.5 degrees). The ball 204 blocks fluid as it rotates from the zero degree position until it reaches the threshold rotational position, where flow begins. As the ball 204 continues to rotate beyond the threshold rotational position, the valve 106 fluid flow through the ball 204 increases.

As the ball 204 continues rotating beyond the threshold rotational position, the opening 240 is progressively and gradually exposed to the inlet port 216 increasing the fluid flow rate through the valve 106. The valve 106 can allow fluid flow therethrough between the threshold rotational position of the ball 204 and the full opening or 100% of the full rotational range of the ball 204.

Notably, the followers 236, 238 are configured to lift the sealing seat 230 off (push the sealing seat 230 away from) the ball 204 before the ball 204 reaches the threshold rotational position. Particularly, before the ball 204 reaches the threshold rotational position as the ball 204 rotates (in the clockwise direction from the zero degree position), the followers 236, 238 begin to engage or contact respective cam surfaces formed in the ball 204, thereby pushing the sealing seat 230 away from the ball 204 and preventing contact therebetween. This way, no rubbing or friction occur between the sealing seat 230 and the ball 204 whenever the ball 204 is in the operational, open rotational range.

Figure 3:
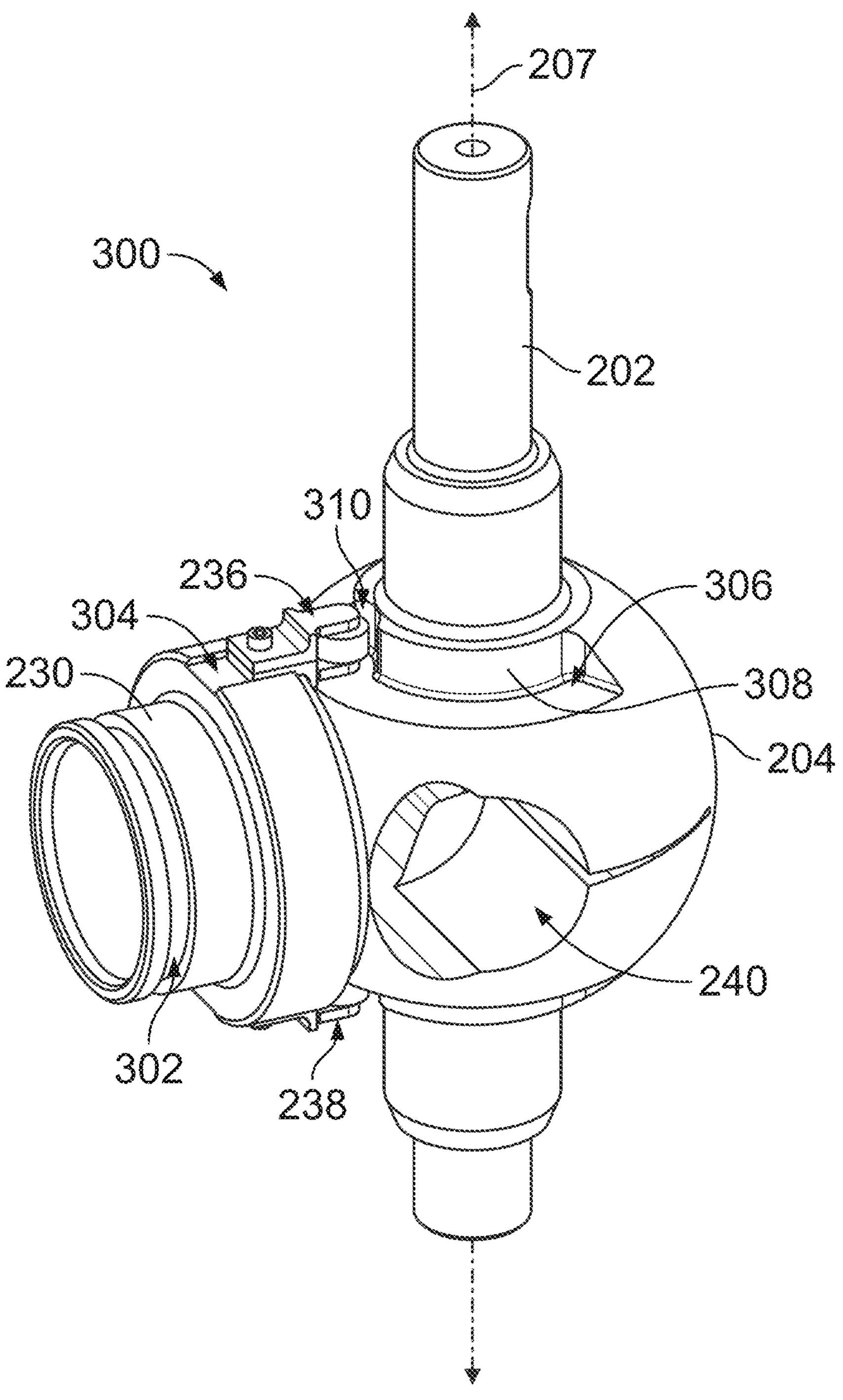
FIG. 3 illustrates a top perspective view of an assembly of a ball, a shaft integrated therewith, and a sealing seat with followers attached, according to an example implementation.
Figure 4:
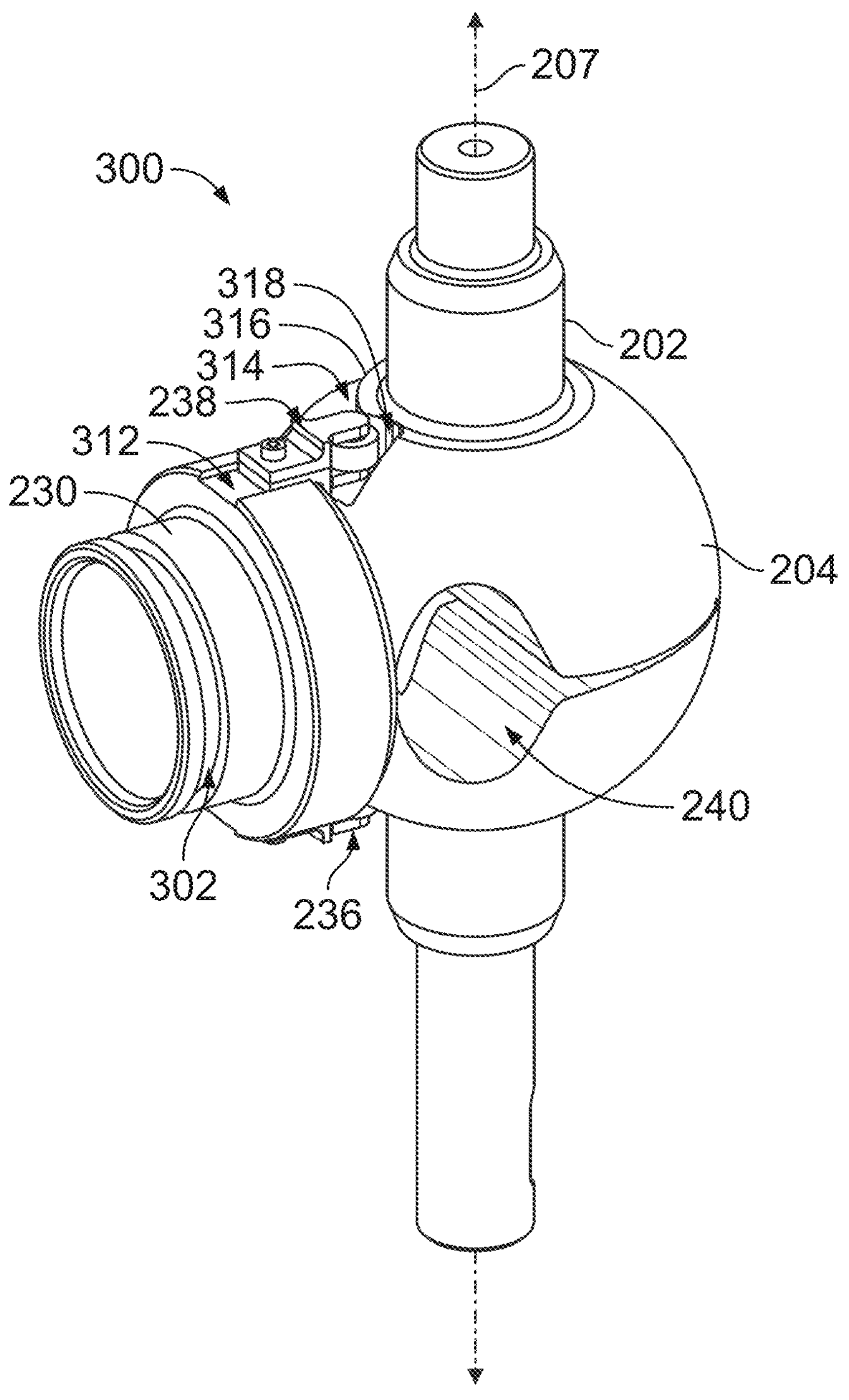
FIG. 4 illustrates a bottom perspective view of the assembly of FIG. 3, according to an example implementation.
Figure 5:
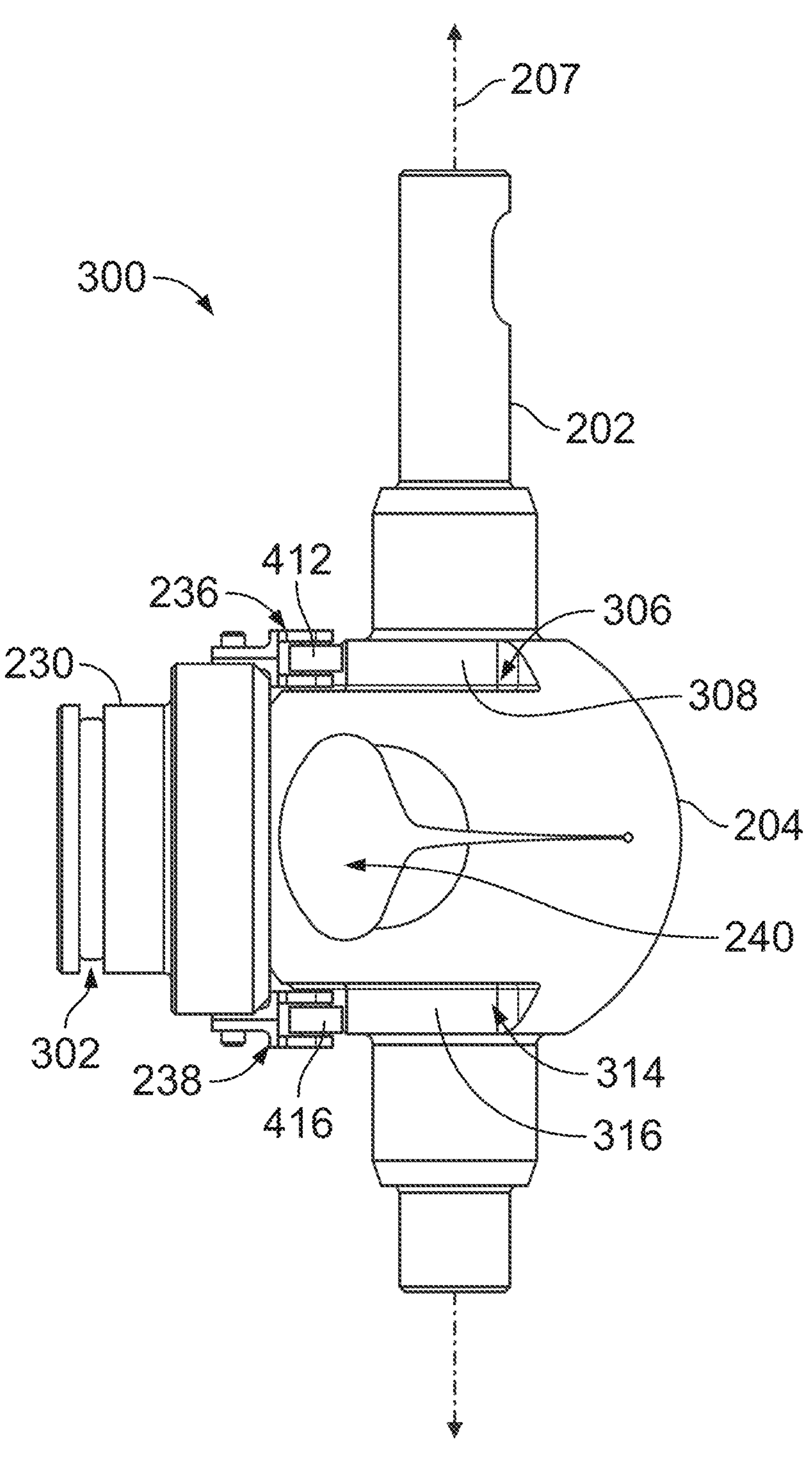
FIG. 5 illustrates a side view of the assembly of FIG. 3, according to an example implementation.

FIG. 3 illustrates a top perspective view of an assembly 300 of the ball 204, the shaft 202 integrated therewith, and the sealing seat 230 with followers attached, FIG. 4 illustrates a bottom perspective view of the assembly 300, and FIG. 5 illustrates a side view of the assembly 300, according to an example implementation. The assembly 300 is a partial or subassembly of the assembly 100.

The assembly 300 is depicted in FIGS. 3-5 where the ball 204 is in the closed position (e.g., un-rotated position) corresponding to FIG. 2. As mentioned above, the shaft 202 is configured to rotate about the longitudinal axis 207 thereof, thereby rotating the ball 204 and gradually exposing the opening 240 to flow from the inlet port 216.

As shown in FIG. 3, the sealing seat 230 has an annular groove 302 in which the radial seal 234 shown in FIG. 2 is disposed. Further, the first follower 236 is coupled to a first side (top side) of the sealing seat 230 and disposed partially in a groove 304 that extends in a direction perpendicular to the longitudinal axis 207.

The ball 204 has an arcuate groove 306 formed on a first side (top side in FIG. 3) of the ball 204. The arcuate groove 306 has a particular angular span about a circumference of the ball 204. In other words, the arcuate groove 306 spans a portion (e.g., 135 degrees) of the circumference of the ball 204.

The arcuate groove 306 defines a cam surface 308 configured to interact with the first follower 236 to lift the sealing seat 230 off the ball 204 as described below. The arcuate groove 306 further includes a depression or pocket 310 at an end of the arcuate groove 306. As depicted in FIG. 3, the pocket 310 is deeper than the rest of the arcuate groove 306 in the direction perpendicular to the longitudinal axis 207. Particularly, while the cam surface 308 is convex, the pocket 310 has a concave boundary.

Referring to FIG. 4, the second follower 238 is coupled to a second side (bottom side) of the sealing seat 230 and disposed partially in a groove 312 that extends in a direction perpendicular to the longitudinal axis 207. The second side (bottom side) of the ball 204 can be a mirror image of the first side (top side) thereof. Particularly, the ball 204 includes an arcuate groove 314 that is formed on the second side (bottom side) of the ball 204.

Similar to the arcuate groove 306, the arcuate groove 314 has a particular angular span about a circumference of the ball 204. In other words, the arcuate groove 314 spans a portion (e.g., 135 degrees) of the circumference of the ball 204.

The arcuate groove 314 defines a cam surface 316 configured to interact with the second follower 238 to lift the sealing seat 230 off the ball 204 as described below. The arcuate groove 314 further includes a pocket 318 at an end of the arcuate groove 314. As depicted in FIG. 4, the pocket 318 is deeper than the rest of the arcuate groove 314 in the direction perpendicular to the longitudinal axis 207.

Figures 6A, 6B:
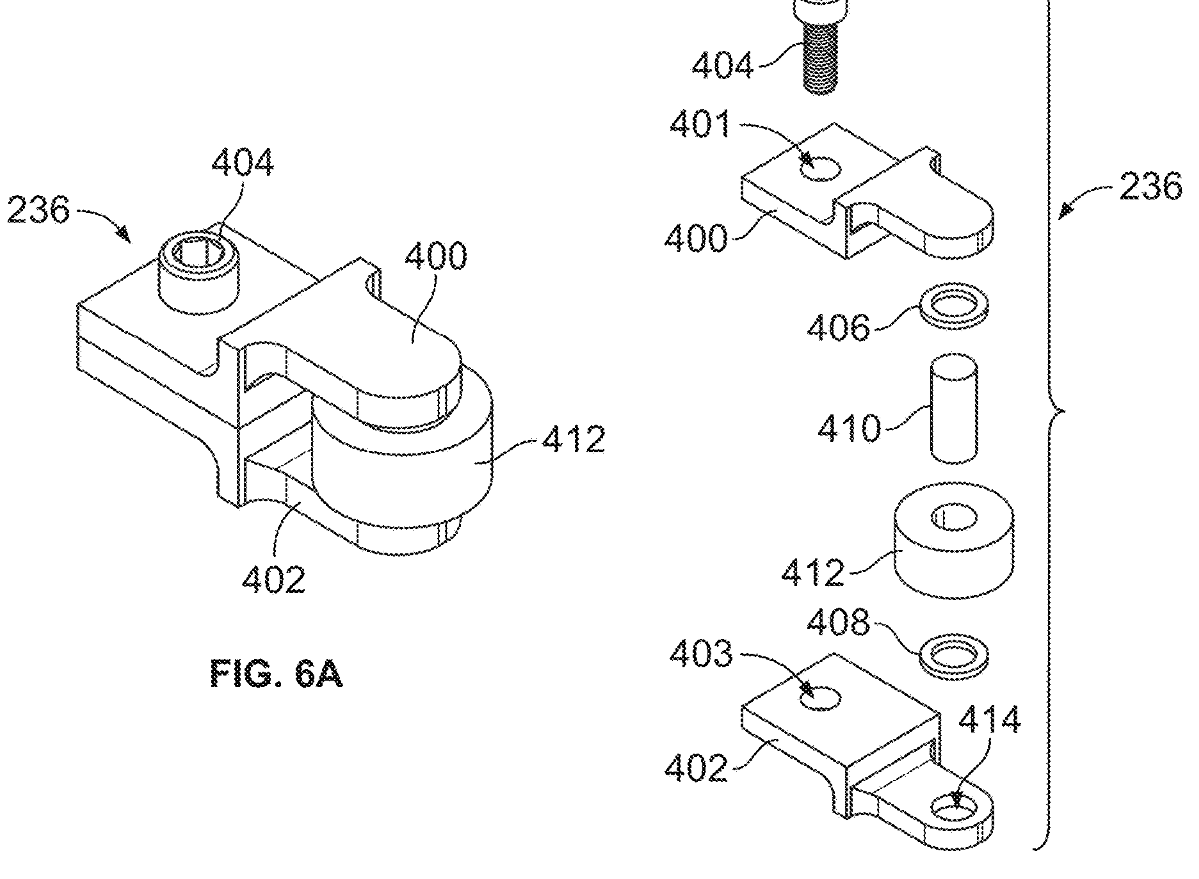
FIG. 6A illustrates a perspective view of a follower, according to an example implementation.
FIG. 6B illustrates a perspective exploded view of the follower of FIG. 6A, according to an example implementation.

FIG. 6A illustrates a perspective view of the first follower 236, and FIG. 6B illustrates a perspective exploded view of the first follower 236, according to an example implementation. As shown, the first follower 236 has a first bracket 400 (e.g., top bracket) and a second bracket 402 (bottom bracket). The first bracket 400 has a hole 401 and the second bracket 402 has a respective hole 403. The first follower 236 includes a fastener 404 (e.g., a screw) configured to be inserted through the hole 401 and the respective hole 403, then screwed into the sealing seat 230 to couple the first follower 236 to the sealing seat 230.

The first follower 236 further includes a first spacer 406, a second spacer 408, a pin 410, and a roller 412 disposed at a tip of the first follower 236. As shown, the roller 412 is configured as a hollow cylinder or disk through which the pin 410 (which is cylindrical in shape) is inserted. The second bracket 402 has a blind hole 414, and the first bracket 400 has a similar blind hole. These blind holes are receptacles that receive respective ends of the pin 410 to retain the pin 410 to the brackets 400, 402. With this configuration, the pin 410 provides a bearing surface about which the roller 412 can rotate about the axis of the pin 410.

The first spacer 406 is mounted on a top side of the roller 412 and is interposed between the roller 412 and the interior surface of the first bracket 400. Similarly, the second spacer 408 is mounted on a bottom side of the roller 412 and is interposed between the roller 412 and the interior surface of the second bracket 402. With this configuration, the spacers 406, 408 allow the roller 412 to rotate freely without friction with the brackets 400, 402. The second follower 238 can be configured similar to the first follower 236 and has a similar construction with a roller 416 as shown in FIG. 5.

Operation of the valve 106 is described with reference to FIGS. 2-5 together. When the valve 106 is in the closed state shown in FIGS. 2-5, the opening 240 of the ball 204 is blocked from the inlet port 216. In this position of the ball 204, the roller 412 of the first follower 236 is disposed in the pocket 310 of the arcuate groove 306, and the roller 416 of the second follower 238 is disposed in the pocket 318 of the arcuate groove 314.

As mentioned above, the valve 106 is configured such that the ball 204 can rotate to a threshold rotational position (e.g., 2.5 degrees rotation of the ball 204) while the opening 240 remains blocked. Thereafter, between the threshold rotational position and 100% of the full rotational range of the ball 204, the opening 240 clears the metering seat 222 and is exposed to the inlet port 216. Particularly, fluid flow increases progressively or gradually as more of the opening 240 is exposed to the inlet port 216 as the ball 204 continues to rotate.

As an example for illustration, the rotational range of the ball 204 can be more than 90 degrees. For instance, the rotational range can be about 100 degrees. Between zero degrees (closed position shown in FIG. 2) and a threshold rotational position (e.g., at about 2.5 degrees), the opening 240 remains blocked. Then, between the threshold rotational position (e.g., about 2.5 degrees) and 100% of the full rotational range (e.g., 90-100 degrees), the opening 240 is exposed to the inlet port 216, and fluid flow is metered through at least a portion of opening 240 based on the rotational position of the ball 204.

Notably, starting from a closed position (e.g., zero degrees rotational position) and rotating the ball 204, before the ball 204 reaches the threshold rotational position (e.g., 2.5 degrees), the rollers 412, 416 remain within the pockets 310, 318. As long as the rollers 412, 416 are within the pockets 310, 318, the rollers 412, 416 are not in contact with, and are thus disengaged from, the cam surfaces 308, 316, respectively. As such, the sealing seat 230 remains in a sealing position, in contact with the ball 204.

Once the ball 204 reaches a particular rotational position that is between the closed position and the threshold rotational position, the rollers 412, 416 begin to engage or make contact with the cam surfaces 308, 316. The phrase "between the closed position and the threshold rotational position" is used herein to encompass a rotational position in the rotational range between the closed position and the threshold rotational position including the threshold rotational position. As such, in some examples, the rollers 412, 416 begin to engage the cam surfaces 308, 316 when the ball 204 is at the threshold rotational position. As the ball 204 rotates further beyond the threshold rotational position (e.g., 2.5 degrees), the rollers 412, 416 remain engaged with the cam surfaces 308, 316 and trace the cam surfaces 308, 316 as the ball 204 continues rotating.

Due to the rollers 412, 416 contacting the cam surfaces 308, 316, the followers 236, 238 are pushed (e.g., to the left in FIGS. 2, 5), thereby moving the sealing seat 230 away from the ball 204. This way, the sealing seat 230 is lifted off the ball 204 and does not contact the ball 204 as long as the ball 204 is in the open or operational range.

Referring to FIG. 2, in examples, the second flange 228 can have a groove 241*a* in which the first follower 236 extends, and includes a groove 241*b* in which the second follower 238 extends. The grooves 241*a*, 241*b* operate as anti-rotation features that prevents the sealing seat 230 from rotating around an axis of the sealing seat 230 when the ball 204 is rotated along the longitudinal axis 207. Particularly, with the first follower 236 extending into and retained by the groove 241*a* and the second follower 238 extending into and retained by the groove 241*b*, the second flange 228 facilitates holding the followers 236, 238 in position so they do not interfere with the ball 204. As such, the rollers 412, 416 are kept parallel with the cam surfaces 308, 316 as the ball 204 rotates.

Figure 7:
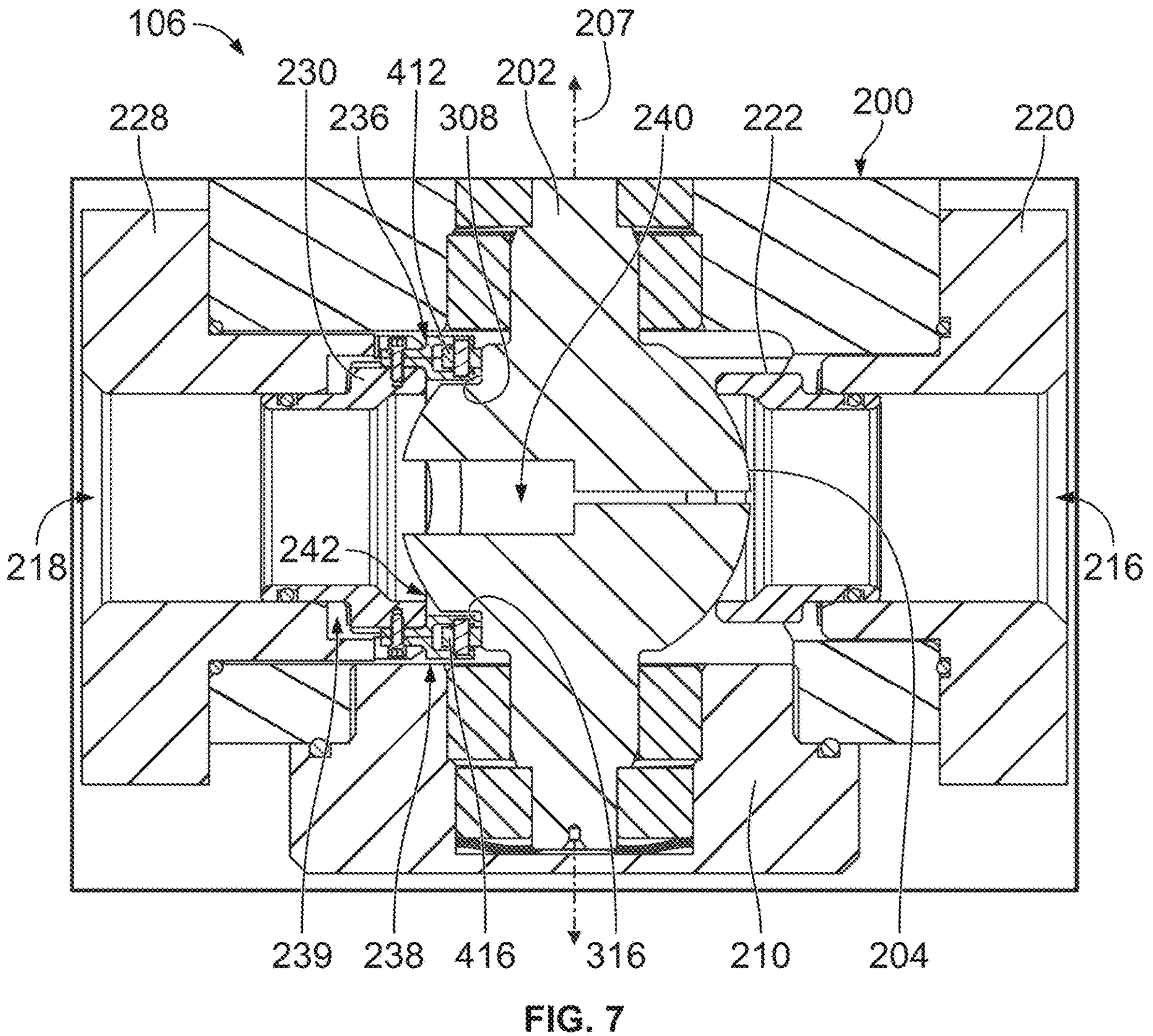
FIG. 7 illustrates a partial cross-sectional view of the valve of FIG. 2 with a sealing seat lifted off a ball of the valve, according to an example implementation.

FIG. 7 illustrates a partial cross-sectional view of the valve 106 with the sealing seat 230 lifted off the ball 204, according to an example implementation. FIG. 7 particularly illustrates the ball 204 being in the operational rotational range where the opening 240 is exposed, at least partially to the inlet port 216.

As shown in FIG. 7, the sealing seat 230 is not in contact with the ball 204, as the followers 236, 238 contact the cam surfaces 308, 316, and the sealing seat 230 is lifted off the ball 204 such that a gap 242 is formed between the sealing seat 230 and the ball 204. As shown, the gap 239 is reduced as the sealing seat 230 is lifted off the ball 204.

Thus, while the ball 204 is in the open rotational range, the sealing seat 230 does not contact the ball 204, and continual rubbing between the ball 204 and the sealing seat 230 is avoided. This way, the sealing exterior surfaces of the sealing seat 230 and the ball 204 do not wear, thereby enhancing the life extent and endurance of the valve 106. This is particularly advantageous as the valve 106 may spend most of its operational life in the operational or flow control range.

The configuration of the valve 106 may provide several advantages. While the sealing seat 230 is lifted off the ball 204 in the open rotational range, the metering seat 222 remains in contact with the ball 204 to control fluid flow (which depends on the extent of exposure of the opening 240 to the inlet port 216 as the ball 204 rotates relative to the metering seat 222). In other words, the sealing function of the sealing seat 230 is separated from the metering function of the metering seat 222, thereby allowing the followers 236, 238 to lift the sealing seat 230 off the ball 204 to preserve it, while the metering seat 222 remains in contact with the ball 204 for flow control.

Notably, in an example, the spring 223 that biases the metering seat 222 toward the ball 204 is weaker (e.g., has a smaller spring rate) than the spring 231 that biases the sealing seat 230 toward the ball 204. Thus, although the metering seat 222 remains in contact with the ball 204, the friction therebetween is reduced due to the weak biasing force of the spring 223.

Further, having the first follower 236 on one side (e.g., top side) of the ball 204 and the second follower 238 on the second side (e.g., bottom side) of the ball 204, causes the sealing seat 230 to be lifted off the ball 204 in an even or uniform manner. In other words, the sealing seat 230 is not side loaded, and the lifting force is applied evenly to the sealing seat 230 on both sides. This reduces the probability that the sealing seat 230 would be tilted as it is being lifted off the ball 204.

Further, the rollers 412, 416 reduce friction between the followers 236, 238 and the ball 204 when the rollers 412, 416 engage the cam surfaces 308, 316. Particularly, the rollers 412, 416 remain in contact with the ball 204 in the open or operational rotational range, and may thus be subjected to the dithering movement of the ball 204. However, the rollers 412, 416 rotate around respective axes of the pins (e.g., the roller 412 rotates about the pin 410) to accommodate such dithering while reducing friction, preserving the life of the rollers 412, 416 and the ball 204.

Under some operating conditions, rotation of the ball 204 may cause the metering seat 222 to move or “rock” sideways (e.g., horizontally). This may cause the flow profile of the valve 106 to vary from what is expected and may increase flow hysteresis, which may be undesirable.

However, it may be desirable to allow the metering seat 222 to move up and down (e.g., vertically) to accommodate movement of the ball 204 up and down due to temperature variations during operation of the valve 106. This way, contact between the metering seat 222 and the ball 204 is maintained. As such, in some examples, it may be desirable to limit or eliminate sideways rocking motion of the metering seat 222, while allowing the metering seat 222 to adjust its vertical position to accommodate vertical movement of the ball 204.

Figure 8A:
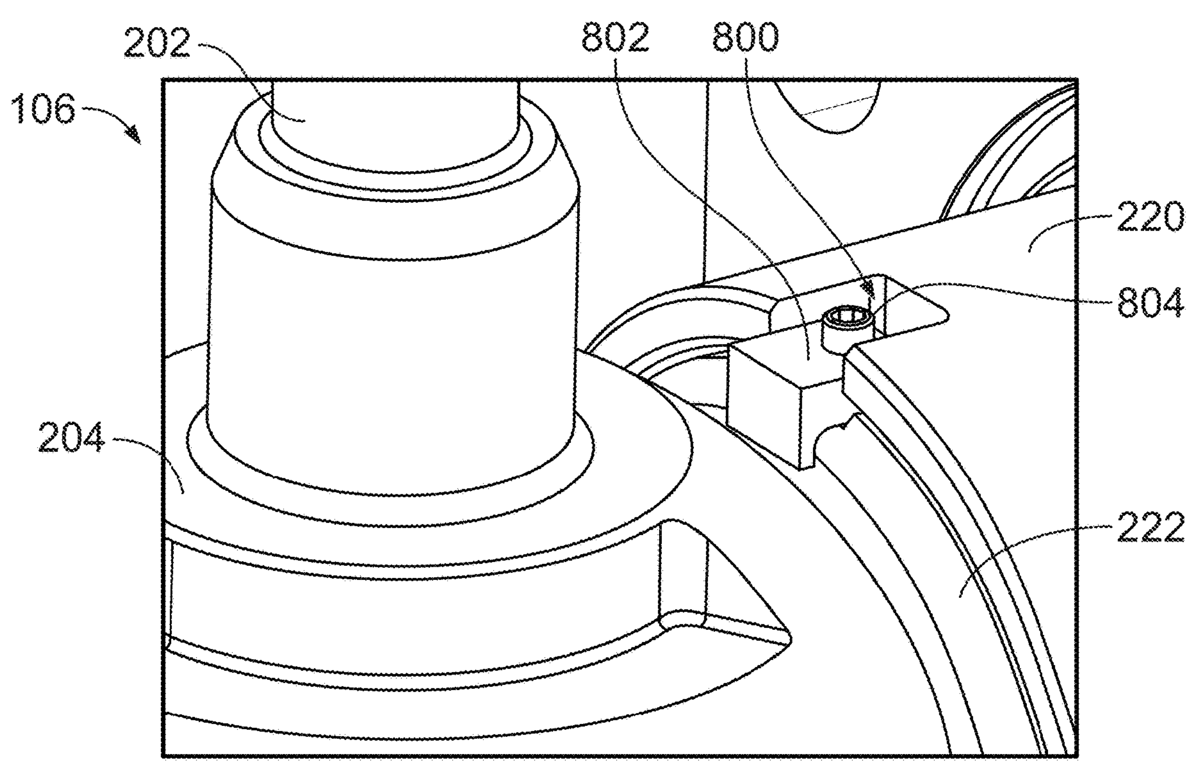
FIG. 8A illustrates a partial perspective view of the valve of FIG. 2 with anti-rocking features, according to an example implementation.
Figure 8B:
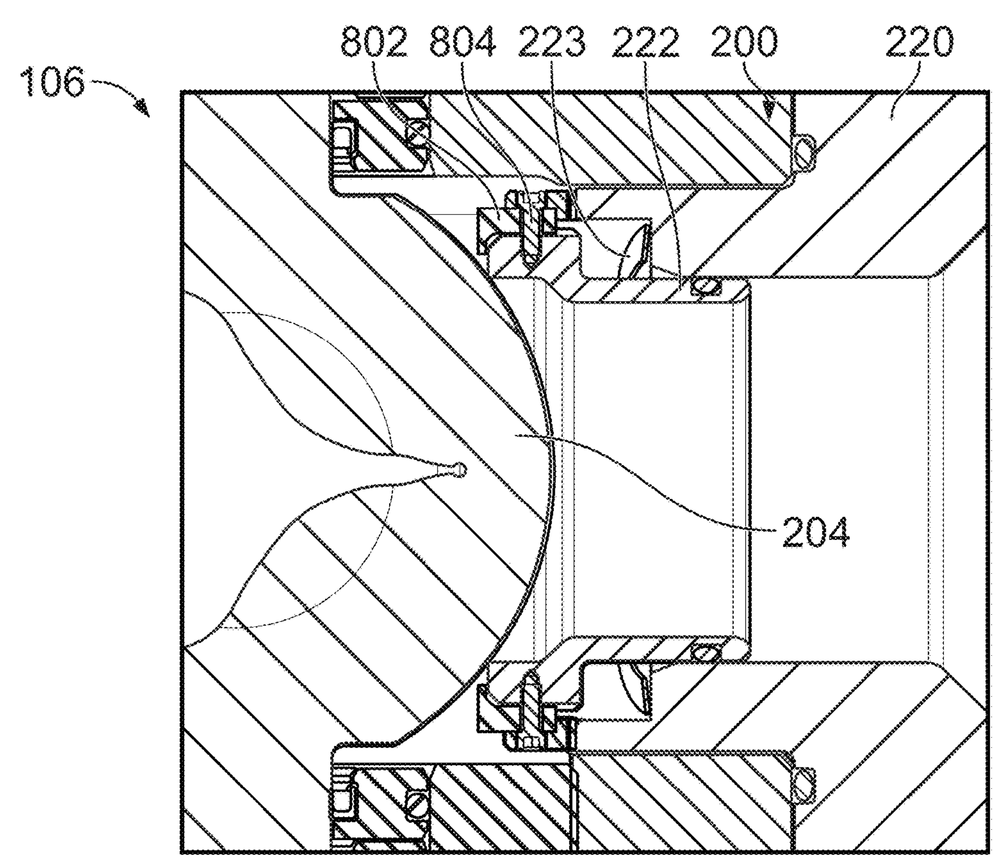
FIG. 8B illustrates a cross-sectional side view corresponding to FIG. 8A, according to an example implementation.

FIG. 8A illustrates a partial perspective view of the valve 106 with anti-rocking features, and FIG. 8B illustrates a cross-sectional side view corresponding to FIG. 8A, according to an example implementation. FIGS. 8A-8B are described together. In the example implementation of FIGS. 8A-8B, the anti-rocking features include a key-keyway arrangement that prevents the metering seat 222 from rocking sideways, while allowing the metering seat 222 to adjust the vertical position thereof.

As shown, a groove or keyway 800 may be formed in the first flange 220, which supports and retains the metering seat 222. Further, a groove or slot may be formed in the metering seat 222 to accommodate an anti-rocking key 802 therein. A fastener 804 can be used to couple the anti-rocking key 802 to the metering seat 222 as depicted.

In the example implementation shown in FIGS. 8A-8B, the keyway 800 has a rectangular or square shape, and the anti-rocking key 802 has a corresponding shape. However, other geometric shapes are contemplated. Regardless of the geometric shape, the anti-rocking key 802 is received within the keyway 800 such that the side surfaces bounding the keyway 800 interact or interface with the side surfaces of the anti-rocking key 802 in a manner that prevents the anti-rocking key 802 and the metering seat 222 coupled thereto from moving sideways.

Particularly, as the ball 204 rotates and side loads the metering seat 222 in contact therewith, the arrangement of the keyway 800 and the anti-rocking key 802 prevents the metering seat 222 from rocking or moving sideways, thereby retaining the metering seat 222 firmly in position. This enhances flow hysteresis characteristics and maintain the flow profile of the valve 106 predictable.

Notably, however, the arrangement of the keyway 800 and the anti-rocking key 802 does not prevent the metering seat 222 from moving up and down in FIGS. 8A-8B. Particularly, the keyway 800 operates as a channel that accommodates slight vertical movement of the anti-rocking key 802 and the metering seat 222 coupled thereto. This way, the metering seat 222 is allowed to move up and down to accommodate vertical movements of the ball 204 resulting from temperature variation during operation of the valve 106.

The arrangement shown in FIGS. 8A-8B is an example implementation and is not meant to be limiting. For example, the location of the keyway 800 and the anti-rocking key 802 can be reversed such that the metering seat 222 includes the keyway 800, while the first flange 220 has the anti-rocking key 802. Other techniques to prevent sideways movement of the metering seat 222 while allowing the metering seat 222 to adjust its vertical position are contemplated.

FIG. 9 is a flowchart of a method 500 of operating the valve 106, according to an example implementation. The method 500 may include one or more operations, functions, or actions as illustrated by one or more of steps 502-506.

Although the steps are illustrated in a sequential order, these steps may also be performed in parallel, and/or in a different order than those described herein. Also, the various steps may be combined into fewer steps, divided into additional steps, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 502, the method 500 includes rotating the ball 204 of the valve 106 from a closed position (e.g., zero degree rotational position), wherein the ball 204 has an opening 240 therethrough to control fluid flow from the inlet port 216 to the outlet port 218, wherein the ball 204 has the cam surface 308, 316, wherein the valve 106 comprises (i) the metering seat 222 that contacts the ball 204, wherein when the ball 204 is rotated to an open position within an open rotational range, the metering seat 222 prevents leakage around the ball 204 and maintains fluid flow from the inlet port 216 through the metering seat 222 and the opening 240 to the outlet port 218, (ii) the sealing seat 230 that contacts the ball 204 when the ball 204 is in a closed position and prevents leakage in either direction through the valve 106, and (iii) the follower 236, 238 coupled to the sealing seat 230.

At block 504, the method 500 includes, upon the ball 204 reaching a particular rotational position (e.g., between the closed position and the threshold rotational position at which the valve 106 opens), causing the follower 236, 238 to engage the cam surface 308, 316, thereby lifting the sealing seat 230 off the ball 204, while the metering seat 222 remains in contact with the ball 204.

At block 506, the method 500 includes further rotating the ball 204 to a threshold rotational position (e.g., 2.5 degrees), thereby exposing at least a portion of the opening 240 (as the opening 240 moves past an edge of the metering seat 222) to allow fluid flow from the inlet port 216 through the metering seat 222 and the opening 240 to the outlet port 218.

The method 500 can further include other steps to operate the valve 106 as described throughout herein.

The detailed description above describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Further, devices or systems may be used or configured to perform functions presented in the figures. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner.

By the term “substantially” or “about” it is meant that the recited characteristic, parameter, or value need not be achieved exactly, but that deviations or variations, including for example, tolerances, measurement error, measurement accuracy limitations and other factors known to those skilled in the art, may occur in amounts that do not preclude the effect the characteristic was intended to provide.

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

Embodiments of the present disclosure can thus relate to one of the enumerated example embodiments (EEEs) listed below.

EEE 1 is a valve comprising: a housing having an inlet port and an outlet port; a shaft disposed within the housing; a ball disposed within the housing and rotatable by the shaft, wherein the ball has an opening therethrough to control fluid flow from the inlet port to the outlet port, and wherein the ball has a cam surface; a metering seat that contacts the ball, wherein when the ball is rotated to an open position within an open rotational range, the metering seat prevents leakage around the ball and maintains fluid flow from the inlet port through the metering seat and the opening to the outlet port; a sealing seat that contacts the ball when the ball is in a closed position and prevents leakage in either direction through the valve; and a follower coupled to the sealing seat, wherein when the ball is in the open rotational range, the follower is engaged with the cam surface, thereby lifting the sealing seat off the ball, while the metering seat remains in contact with the ball.

EEE 2 is the valve of EEE 1, wherein the open rotational range comprises any rotational position between a threshold rotational position and a full rotation position, wherein the follower begins to engage the cam surface at a particular rotational position between the closed position and the threshold rotational position, such that the sealing seat remains in contact with the ball when the ball is between the closed position and the particular rotational position.

EEE 3 is the valve of any of EEEs 1-2, wherein the ball comprises an arcuate groove that defines the cam surface.

EEE 4 is the valve of EEE 3, wherein the arcuate groove comprises a pocket at an end thereof, wherein the sealing seat contacts the ball when the follower is received within the pocket.

EEE 5 is the valve of any of EEEs 1-4, wherein the follower comprises a roller that engages the cam surface when the ball is within the open rotational range.

EEE 6 is the valve of EEE 5, wherein the follower further comprises: a first bracket; a second bracket; and a pin disposed through the roller, and interposed between the first bracket and the second bracket.

EEE 7 is the valve of EEE 6, wherein the follower further comprises: a first spacer interposed between the roller and the first bracket; and a second spacer interposed between the roller and the second bracket.

EEE 8 is the valve of any of EEEs 1-7, wherein the cam surface is a first cam surface, wherein the ball comprises a second cam surface, wherein the follower is a first follower coupled to a first side of the sealing seat, and wherein the valve further comprises: a second follower coupled to a second side of the sealing seat, opposite the first side, wherein when the ball is in the open rotational range, the second follower is engaged with the second cam surface, thereby lifting the sealing seat off the ball.

EEE 9 is the valve of any of EEEs 1-8, further comprising: a first spring that biases the metering seat toward the ball; and a second spring that biases the sealing seat toward the ball, wherein the first spring is weaker than the second spring.

EEE 10 is an assembly comprising: an electronics module; an electric motor, wherein the electronics module is mounted to and controls the electric motor; and the valve of any of EEEs 1-9. For example, the valve comprises: a housing having an inlet port and an outlet port, a shaft disposed and rotatable within the housing via the electric motor, and a ball disposed within the housing and rotatable by the shaft, wherein the ball has an opening therethrough to control fluid flow from the inlet port to the outlet port, and wherein the ball has a cam surface, a metering seat that contacts the ball, wherein when the ball is rotated to an open position within an open rotational range, the metering seat prevents leakage around the ball and maintains fluid flow from the inlet port through the metering seat and the opening to the outlet port, a sealing seat that contacts the ball when the ball is in a closed position and prevents leakage in either direction through the valve, and a follower coupled to the sealing seat, wherein when the ball is in the open rotational range, the follower is engaged with the cam surface, thereby lifting the sealing seat off the ball, while the metering seat remains in contact with the ball.

EEE 11 is the assembly of EEE 10, wherein the open rotational range comprises any rotational position between a threshold rotational position and a full rotation position, wherein the follower begins to engage the cam surface at a particular rotational position between the closed position and the threshold rotational position, such that the sealing seat remains in contact with the ball when the ball is between the closed position and the particular rotational position.

EEE 12 is the assembly of EEE 11, wherein the ball comprises an arcuate groove that defines the cam surface, wherein the arcuate groove comprises a pocket at an end thereof, wherein the follower is received within the pocket when the ball is between the closed position and the particular rotational position.

EEE 13 is the assembly of any of EEEs 10-12, wherein the follower comprises a roller that engages the cam surface when the ball is within the open rotational range.

EEE 14 is the assembly of EEE 13, wherein the follower further comprises: a first bracket; a second bracket; and a pin disposed through the roller, and interposed between the first bracket and the second bracket.

EEE 15 is the assembly of EEE 14, wherein the follower further comprises: a first spacer interposed between the roller and the first bracket; and a second spacer interposed between the roller and the second bracket.

EEE 16 is the assembly of EEE 10, wherein the cam surface is a first cam surface, wherein the ball comprises a second cam surface, wherein the follower is a first follower coupled to a first side of the sealing seat, and wherein the valve further comprises: a second follower coupled to a second side of the sealing seat, opposite the first side, wherein as long as the ball is in the open rotational range, the second follower is engaged with the second cam surface, thereby lifting the sealing seat off the ball.

EEE 17 is a method of operating the valve of any of EEEs 1-9 or the assembly of EEEs 10-16. For example, the method comprises: rotating a ball of a valve from a closed position, wherein the ball has an opening therethrough to control fluid flow from an inlet port to an outlet port, wherein the ball has a cam surface, wherein the valve comprises (i) a metering seat that contacts the ball, wherein when the ball is rotated to an open position within an open rotational range, the metering seat prevents leakage around the ball and maintains fluid flow from the inlet port through the metering seat and the opening to the outlet port, (ii) a sealing seat that contacts the ball when the ball is in a closed position and prevents leakage in either direction through the valve, and (iii) a follower coupled to the sealing seat; upon the ball reaching a particular rotational position, causing the follower to engage the cam surface, thereby lifting the sealing seat off the ball, while the metering seat remains in contact with the ball; and further rotating the ball to a threshold rotational position, thereby exposing at least a portion of the opening to allow fluid flow from the inlet port through the metering seat and the opening to the outlet port.

EEE 18 is the method of EEE 17, wherein the cam surface is a first cam surface, wherein the ball comprises a second cam surface, wherein the follower is a first follower coupled to a first side of the sealing seat, and wherein the valve further comprises a second follower coupled to a second side of the sealing seat, opposite the first side, and wherein the method further comprises: upon the ball reaching the particular rotational position, causing the second follower to engage the second cam surface, thereby lifting the sealing seat off the ball, while the metering seat remains in contact with the ball.

EEE 19 is the method of any of EEEs 17-18, wherein the follower comprises a roller, wherein causing the follower to engage the cam surface comprises: causing the roller to engage the cam surface.

EEE 20 is the method of any of EEEs 18-19, wherein the ball comprises an arcuate groove that defines the cam surface, wherein the arcuate groove comprises a pocket at an end thereof, and wherein the follower is received within the pocket when the ball is between the closed position and the particular rotational position.

EEE 21 is the valve of any of EEEs 1-9, the assembly of any of EEEs 10-16, or the method of any of EEEs 17-20, wherein the valve further comprises a flange coupled to the housing and configured to support the metering seat, wherein the flange prevents the metering seat from rocking sideways, while allowing the metering seat to adjust a vertical position thereof.

EEE 22 is the valve of EEE 21, wherein the flange and the metering seat comprise a key-keyway arrangement that prevents the metering seat from rocking sideways, while allowing the metering seat to adjust the vertical position thereof.

EEE 23 is the valve of EEE 22, wherein the key-keyway arrangement comprises: a keyway formed in the flange; and an anti-rocking key coupled to the metering seat and received within the keyway.

What is claimed is:

1. A valve comprising:

a housing having an inlet port and an outlet port;

a shaft disposed within the housing;

a ball disposed within the housing and rotatable by the shaft, wherein the ball has an opening therethrough to control fluid flow from the inlet port to the outlet port, and wherein the ball has a cam surface;

a metering seat that contacts the ball, wherein when the ball is rotated to an open position within an open rotational range, the metering seat prevents leakage around the ball and maintains fluid flow from the inlet port through the metering seat and the opening to the outlet port;

a sealing seat that contacts the ball when the ball is in a closed position and prevents leakage in either direction through the valve; and a follower coupled to the sealing seat, wherein when the ball is in the open rotational range, the follower is engaged with the cam surface, thereby lifting the sealing seat off the ball, while the metering seat remains in contact with the ball.

2. The valve of claim 1, wherein the open rotational range comprises any rotational position between a threshold rotational position and a full rotation position, wherein the follower begins to engage the cam surface at a particular rotational position between the closed position and the threshold rotational position, such that the sealing seat remains in contact with the ball when the ball is between the closed position and the particular rotational position.

3. The valve of claim 1, wherein the ball comprises an arcuate groove that defines the cam surface.

4. The valve of claim 3, wherein the arcuate groove comprises a pocket at an end thereof, wherein the sealing seat contacts the ball when the follower is received within the pocket.

5. The valve of claim 1, wherein the follower comprises a roller that engages the cam surface when the ball is within the open rotational range.

6. The valve of claim 5, wherein the follower further comprises:

a first bracket;

a second bracket; and a pin disposed through the roller, and interposed between the first bracket and the second bracket.

7. The valve of claim 6, wherein the follower further comprises:

a first spacer interposed between the roller and the first bracket; and a second spacer interposed between the roller and the second bracket.

8. The valve of claim 1, wherein the cam surface is a first cam surface, wherein the ball comprises a second cam surface, wherein the follower is a first follower coupled to a first side of the sealing seat, and wherein the valve further comprises:

a second follower coupled to a second side of the sealing seat, opposite the first side, wherein when the ball is in the open rotational range, the second follower is engaged with the second cam surface, thereby lifting the sealing seat off the ball.

9. The valve of claim 1, further comprising:

a first spring that biases the metering seat toward the ball; and a second spring that biases the sealing seat toward the ball, wherein the first spring is weaker than the second spring.

10. The valve of claim 1, further comprising:

a flange coupled to the housing and configured to support the metering seat, wherein the flange prevents the metering seat from rocking sideways, while allowing the metering seat to adjust a vertical position thereof.

11. The valve of claim 10, wherein the flange and the metering seat comprise a key-keyway arrangement that prevents the metering seat from rocking sideways, while allowing the metering seat to adjust the vertical position thereof.

12. The valve of claim 11, wherein the key-keyway arrangement comprises:

a keyway formed in the flange; and an anti-rocking key coupled to the metering seat and received within the keyway.

13. An assembly comprising:

an electronics module;

an electric motor, wherein the electronics module is mounted to and controls the electric motor; and a valve comprising:

a housing having an inlet port and an outlet port, a shaft disposed and rotatable within the housing via the electric motor, and a ball disposed within the housing and rotatable by the shaft, wherein the ball has an opening therethrough to control fluid flow from the inlet port to the outlet port, and wherein the ball has a cam surface, a metering seat that contacts the ball, wherein when the ball is rotated to an open position within an open rotational range, the metering seat prevents leakage around the ball and maintains fluid flow from the inlet port through the metering seat and the opening to the outlet port, a sealing seat that contacts the ball when the ball is in a closed position and prevents leakage in either direction through the valve, and a follower coupled to the sealing seat, wherein when the ball is in the open rotational range, the follower is engaged with the cam surface, thereby lifting the sealing seat off the ball, while the metering seat remains in contact with the ball.

14. The assembly of claim 13, wherein the open rotational range comprises any rotational position between a threshold rotational position and a full rotation position, wherein the follower begins to engage the cam surface at a particular rotational position between the closed position and the threshold rotational position, such that the sealing seat remains in contact with the ball when the ball is between the closed position and the particular rotational position.

15. The assembly of claim 14, wherein the ball comprises an arcuate groove that defines the cam surface, wherein the arcuate groove comprises a pocket at an end thereof, wherein the follower is received within the pocket when the ball is between the closed position and the particular rotational position.

16. The assembly of claim 13, wherein the follower comprises a roller that engages the cam surface when the ball is within the open rotational range.

17. A method comprising:

rotating a ball of a valve from a closed position, wherein the ball has an opening therethrough to control fluid flow from an inlet port to an outlet port, wherein the ball has a cam surface, wherein the valve comprises (i) a metering seat that contacts the ball, wherein when the ball is rotated to an open position within an open rotational range, the metering seat prevents leakage around the ball and maintains fluid flow from the inlet port through the metering seat and the opening to the outlet port, (ii) a sealing seat that contacts the ball when the ball is in a closed position and prevents leakage in either direction through the valve, and (iii) a follower coupled to the sealing seat;

upon the ball reaching a particular rotational position, causing the follower to engage the cam surface, thereby lifting the sealing seat off the ball, while the metering seat remains in contact with the ball; and further rotating the ball to a threshold rotational position, thereby exposing at least a portion of the opening to allow fluid flow from the inlet port through the metering seat and the opening to the outlet port.

18. The method of claim 17, wherein the cam surface is a first cam surface, wherein the ball comprises a second cam surface, wherein the follower is a first follower coupled to a first side of the sealing seat, and wherein the valve further comprises a second follower coupled to a second side of the sealing seat, opposite the first side, and wherein the method further comprises:

upon the ball reaching the particular rotational position, causing the second follower to engage the second cam surface, thereby lifting the sealing seat off the ball, while the metering seat remains in contact with the ball.

19. The method of claim 17, wherein the follower comprises a roller, wherein causing the follower to engage the cam surface comprises:

causing the roller to engage the cam surface.

20. The method of claim 18, wherein the ball comprises an arcuate groove that defines the cam surface, wherein the arcuate groove comprises a pocket at an end thereof, and wherein the follower is received within the pocket when the ball is between the closed position and the particular rotational position.

* * * * *